Oct. 17, 1933.    A. H. OELKERS    1,930,689
LUBRICATING MEANS FOR CAR AXLES
Filed Sept. 16, 1927
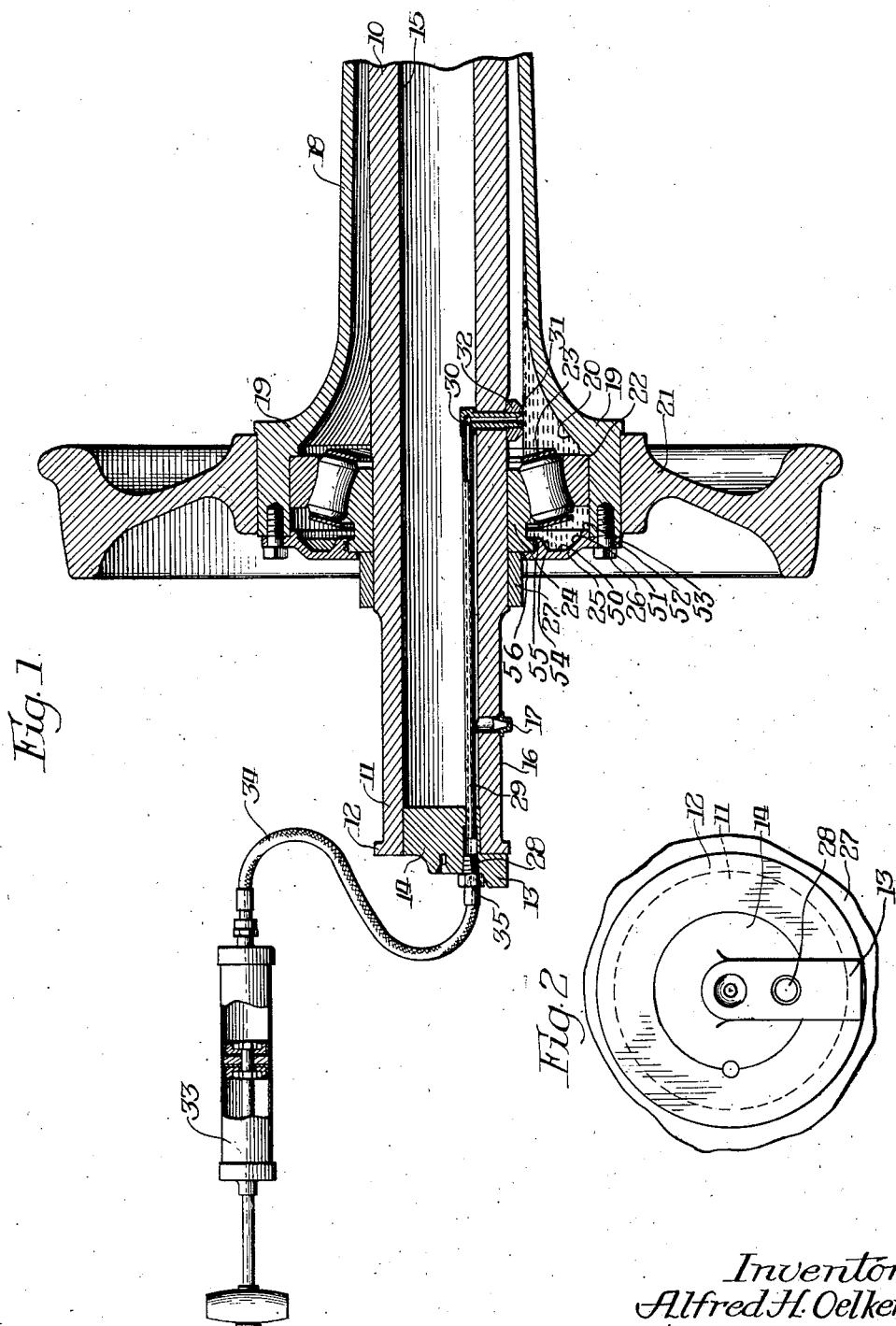

Patented Oct. 17, 1933

1,930,689

UNITED STATES PATENT OFFICE 1,930,689

LUBRICATING MEANS FOR CAR AXLES

Alfred H. Oelkers, Chicago, Ill., assignor to American Steel Foundries, Chicago, Ill., a corporation of New Jersey Application September 16, 1927
Serial No. 219,849

13 Claims. (Cl. 308—180)

This invention pertains to railway trucks, and more particularly to means for supplying proper amounts of lubricant to the bearings of a wheel and axle assembly.

More or less difficulty has heretofore been encountered in properly lubricating bearings such as are used on car axles, particularly of the type embodying a relatively fixed and relatively movable type of axle. It has been usual to provide a plug in one of said axles which may be removed to allow lubricant to be injected or inserted, but the trouble with this method is that there is much waste and it is not at all a sure one as the plugs sometimes work loose and are lost. Also, the position of the plug makes it very difficult oftentimes to properly insert the lubricant because should the plug be below the center of the axle, it will of course be understood that lubricant would have to be forced into the opening with a consequent loss of lubricant when the gun or other means is removed and while the plug is being inserted to close the opening. And then too, the location of such a plug is such that it makes the operation of the lubricating means difficult.

It is therefore an object of this invention to provide lubricating means for supplying the proper amount of lubricant to bearings as well as to provide a means to meet all the requirements of manufacture and service.

Another object is to provide lubricating means for wheel and axle assemblies which is inexpensive and is disposed in such a position as will not interfere with the operation of the assemblies.

Still another object is to provide a double acting lubricating means for bearings permitting adjustment of the lubricant level by withdrawing any excess amount, thereby preventing waste or leakage.

Yet another object is to provide an assembly having the lubricating means so disposed and arranged that the lubricant level is indicated by the device or determined by the operator.

A further object is to provide a wheel and axle assembly so arranged and constructed as to effect pumping action towards the bearings of said assembly.

Still further object is to provide a wheel and axle assembly so arranged and constructed as to effect in operation a double centrifugal action to lubricate the bearings of said assembly.

With these and various other objects in view, the invention consists of certain novel features of construction and operation as will be more fully described and particularly pointed out in the specification, drawing and claims appended hereto.

In the drawing, wherein like reference characters are used to designate like parts—

Figure 1 is a transverse fragmentary sectional elevation of one end of a wheel and axle assembly constructed in accordance with the invention; and Figure 2 is an enlarged fragmentary plan of plug and fitting adapted to close the relatively fixed axle.

Inasmuch as the two ends of the axle assembly are similar, only one end is disclosed in the drawing and described in the specification as it is believed that this will be sufficient for the purposes of illustration.

The assembly consists essentially of a normally stationary inner axle 10 having a reduced end portion 11 terminating in a flange 12 which constitutes a supporting end of the structure similar to the standard A. R. A. journal axle and is accordingly one which is capable of being mounted in the customary journal boxes in engagement with the standard A. R. A. journal brasses, and indeed, the whole assembly with the exception of the lubricating means, is made in accordance with the invention disclosed in my copending application, Serial No. 211,385, filed August 8, 1927. It is therefore thought not necessary to describe the various parts in detail, but only such parts as are essential will be described to more clearly illustrate the invention.

It will of course be appreciated that the end of the axle 10 projects into a journal box similar to that shown and described in the above referred to application, the same being provided with a cover provided with suitable frangible lugs for engaging the eccentric or offset lug 13 on the plug 14 for normally allowing only a limited rotation of the axle 10. The plug 14 serves to close the hollow bore 15 provided in the axle 10 which is for the purpose of containing a quantity of lubricant for emergency use of the frictional journal bearing 16 provided on the reduced end portion 11, it being understood that a properly located frangible cap 17 is provided on said bearing and is adapted to be sheared off due to excess rotation of the shaft 10 caused by binding of the shafts through breakage, lack of lubrication, etc.

Outer rotatable axle 18 terminates at or near the end thereof in a flared or depressed portion 19 forming a recess 20 on the inside thereof. Said portion provides an attachment for the wheel 21, secured thereto in any suitable manner. Said portion also provides a securing means for an outer race ring 22 of anti-friction roller bearing assembly 23, the inner race ring 24 being secured to the inner axle 10. An annular cover plate 25 secured to the outer axle such as by means of the bolts 26, closes the opening between the flared portion of the outer axle, the inner race ring and a collar 27 shrunk on the inner axle in such a position as to properly align, secure and place the bearing assembly 23. This cover plate is shaped to provide an annular groove 50 in way of the bearings 23, the groove being shaped outwardly toward the periphery as at 51, terminating in a shoulder 52, and securing portion 53. This groove also slopes inwardly towards the axle as at 54, terminating in an annular shoulder 55 and a depending flange 56 fitting and cooperating with the inner race ring 24 and the collar 27.

The plug 14 is provided with a threaded opening 28 normally closed by a threaded plug and disposed between the center and the lug 13 thereof, and a pipe 29 leads from said opening to a fitting 30 disposed inwardly of the bearing assemblies, said pipe making an oil-tight fit at the opening 28 and with the fitting. This fitting extends through the wall of the axle 10, terminating at 31 and secured by a nut 32. A grease gun 33 of the double acting type is provided with a flexible hose 34 having a suitable fitting 35 thereon adapted to be threaded into the opening 28 upon removal of the threaded plug. It will of course be appreciated that any form of connection may be made between the gun and the lubricant passage, the connection above described being merely illustrative.

In operation of an assembly of this character, it will of course be understood that the inner axle 10 is free to rotate through 180°, the amount of rotation being limited by engagement of the lug 13 on the plug 14 with a suitable lug provided on the cover of the journal box, as already described. This is for the purpose of prolonging the life of the bearing assembly 23 as explained in the above referred to application. When it is desired to lubricate the bearing assembly 23, it is only necessary to raise the journal box cover and position the lug 13 so that it is in extreme lower position; that is, so that a plane passing through the lug 13, through the hole 28, the center of the axle and through the fitting 30, is vertically disposed. The plug normally closing the opening 28 is removed and the lubricant gun 33 is attached thereto through the fitting 35. Lubricant is then forced by the gun through the hose 34, through opening 28, through pipe 29, through fitting 30 into the lubricant recess 20. It has been found that the proper amount of lubricant is substantially as illustrated in Figure 1; that is, when the level of the lubricant is at the lower portion of the nut 32, that is sufficient. Any further amount may be lost or wasted. Any excess amount of lubricant will be forced out past the cover plate 25, the inner race ring 24 and the collar 27. When this is done, the plunger of the gun is merely retracted a certain amount and the lubricant will be sucked back from the lubricant recess 20 until the proper amount remains, said amount being determined either by some measuring means provided, through experience and judgment of the operator, or through action of the system itself.

It will readily be appreciated that during suction operation of the gun, i. e. when the lubricant is being retracted from recess 20, the flow of lubricant to the gun is even and has a certain pull or feel, but as soon as the level is immediately below the opening in the fitting 30 interrupting the flow thereof, the gun sucks air with a distinctly different feel. In this way the correct level is indicated to the operator who can then detach his gun and close the opening 28.

It will be seen that a device is provided which allows easy and positive lubrication of the bearing assemblies and one which may be accomplished readily from outside the truck and without any attachment to any complicated device.

Once lubricant has been inserted in the assembly, it will be noticed that as the outer axle 18 flares outwardly from the center, lubricant will be locally retained in its proper recess. And as the flange 56 extends above the lubricant level, there will be little or no leakage even though the lubricant should find its way past the shoulder 55. When the assembly is in operation, the lubricant is retained in the recesses and the bearings are more positively lubricated due to the outward flare of the axle 18 and the sloping surfaces of the cover plate 25, which in effect form a double centrifugal pump tending to direct the lubricant on both sides of the bearings toward said bearings.

It is of course understood that I do not wish to be limited by the exact embodiment illustrated as other and various forms will of course occur to those skilled in the art.

I claim:

1. In a device of the character described, the combination of a wheeled axle assembly, said assembly including an axle rotatable with said wheels and an axle normally non-rotatable with said wheels, said rotatable axle having bearing recesses disposed therein, bearings disposed in said recesses and cooperating with said axles, said non-rotatable axle having a lubricant carrying portion disposed therein, and plugs for closing said portion and controlling rotation of said axle, said plugs having means of ingress to conduits disposed in said lubricant carrying portion and communicating with said bearings on the inside of said recesses to allow lubrication of said bearings.

2. In a device of the character described, the combination of a wheeled axle assembly, said assembly including an axle rotatable with said wheels and an axle non-rotatable with said wheels, said rotatable axle having bearing recesses disposed therein, bearings disposed in said recesses and cooperating with said axles, said non-rotatable axle having a lubricant carrying portion disposed therein, and plugs for closing said portion and controlling rotation of said axle, said plugs having means of ingress to conduits disposed in said lubricant carrying portion connected to said plugs and to a portion of said non-rotatable axle and communicating with said bearings on the inside of said recesses to provide means for lubricating said bearings.

3. In a wheel and axle assembly, the combination of inner and outer concentric fixed and rotary axles, the inner stationary axle being hollow to receive lubricant therein and having closing means for the ends thereof, the outer rotary axle having flared ends forming lubricant recesses and wheel supporting hubs, wheels mounted thereon, bearings mounted in said recesses and cooperating with said axles, and means disposed between said axles for closing said recesses, said means including a cover plate having an annular portion so disposed as to direct lubricant to said bearings.

4. In a wheel and axle assembly, the combination of inner and outer concentric fixed and rotary axles, the inner stationary axle being hollow to receive lubricant therein and having closing means for the ends thereof, the outer rotary axle having flared ends forming lubricant recesses and wheel supporting hubs, wheels mounted thereon, bearings mounted in said recesses and cooperating with said axles, means disposed between said axles for closing said recesses, said means including a cover plate having an annular portion so disposed as to direct lubricant to said bearings, and means carried by said fixed axle and communicating with said recesses for supplying and determining the amount of lubricant to be supplied to said recesses.

5. In a wheel and axle assembly, the combination of inner and outer concentric fixed and rotary axles, the inner stationary axle being hollow to receive lubricant therein and having closing means for the ends thereof, the outer rotary axle having flared ends forming lubricant recesses and wheel supporting hubs, wheels mounted thereon, bearings mounted in said recesses and cooperating with said axles, means disposed between said axles for closing said recesses, said means including a cover plate having an annular portion so disposed as to direct lubricant to said bearings, and means carried by said fixed axle and communicating with said recesses for supplying lubricant to said recesses, said means also serving to determine the amount of lubricant in said recesses by permitting retraction of a portion of lubricant from said recesses until a predetermined level is reached.

6. In a wheel and axle assembly, the combination of inner and outer concentric fixed and rotary axles, the inner stationary axle being hollow to receive lubricant therein and having closing means for the ends thereof, the outer rotary axle having flared ends forming lubricant recesses and wheel supporting hubs, wheels mounted thereon, bearings mounted in said recesses and cooperating with said axles, means disposed between said axles for closing said recesses, said means including a cover plate having an annular portion so disposed as to direct lubricant to said bearings, and means carried by said fixed axle and communicating with said recesses for supplying lubricant to said recesses, said means also serving to determine the amount of lubricant in said recesses by permitting retraction of a portion of lubricant from said recesses until a predetermined level is reached, said level being determined by said means ceasing to function to retract lubricant and to suck air.

7. In a wheel and axle assembly, the combination of a wheeled axle, an axle cooperating therewith, bearings between said axles, a bearing portion on said second named axle, means whereby lubricant is supplied in emergency from said second named axle to said bearing portion, and means for supplying lubricant to said bearings.

8. In a wheel and axle assembly, the combination of the wheeled axle, a hollow lubricant containing axle cooperating therewith, bearings between said axles, a bearing portion of said second named axle spaced from said first named axle, means whereby lubricant is supplied in emergency from said second named axle to said bearing portion, and means in said second named axle for supplying lubricant to said bearings.

9. In a wheel and axle assembly, the combination of a rotary axle, a normally stationary axle, bearings between said axles, a bearing portion on said second-named axle and in spaced relation to said bearings, means for supplying lubricant to said bearings, and means operable under certain conditions for supplying a lubricant from said second-named axle to said bearing portion.

10. In a wheel and axle assembly, the combination of a rotary axle, a normally stationary axle, bearings between said axles, a bearing portion on said second-named axle and in spaced relation to said bearings, means in said second-named axle for supplying lubricant to said bearings, and means operable under certain conditions for supplying a lubricant from said second-named axle to said bearing portion.

11. In a wheel and axle assembly, the combination of a pair of radially spaced axles having lubricant carrying portions, bearings disposed wholly within the lubricant carrying portions of one of said axles, and a conduit in the other of said axles for introducing lubricant from the exterior of said axle to said bearings.

12. In a wheel and axle assembly, the combination of a pair of radially spaced axles having lubricant carrying portions, one of said axles having enlarged parts forming the lubricant carrying portions therefor, bearings disposed wholly within said enlarged lubricant carrying portions, and a conduit in the other of said axles for introducing lubricant from the exterior of said axle to said bearings.

13. In a wheel and axle assembly, the combination of a pair of radially spaced axles having lubricant carrying portions, one of said axles having enlarged wheel receiving portions and being rotatable therewith, said portions forming lubricant carrying portions for said axle, bearings disposed wholly within said enlarged lubricant carrying portions, and a conduit in the other of said axles for introducing lubricant from the exterior of said axle to said bearings.

ALFRED H. OELKERS.